United States Patent
Chi

(10) Patent No.: US 10,356,828 B2
(45) Date of Patent: Jul. 16, 2019

(54) METHOD FOR CONTROLLING A WIRELESS ACCESS DEVICE USING CHANNEL AVOIDANCE BETWEEN PROCESSORS OF THE WIRELESS ACCESS DEVICE

(71) Applicant: WITHWIN TECHNOLOGY SHENZHEN CO., LTD., Shenzhen, Guangdong (CN)

(72) Inventor: Xindong Chi, Shenzhen (CN)

(73) Assignee: WITHWIN TECHNOLOGY SHENZHEN CO., LTD., Shenzhen (CN)

( * ) Notice: Subject to any disclaimer, the term of this patent is extended or adjusted under 35 U.S.C. 154(b) by 56 days.

(21) Appl. No.: 15/548,140

(22) PCT Filed: Apr. 15, 2016

(86) PCT No.: PCT/CN2016/079425
§ 371 (c)(1),
(2) Date: Aug. 2, 2017

(87) PCT Pub. No.: WO2017/059669
PCT Pub. Date: Apr. 13, 2017

(65) Prior Publication Data
US 2018/0035357 A1    Feb. 1, 2018

(30) Foreign Application Priority Data

Oct. 9, 2015    (CN) .......................... 2015 1 0648826

(51) Int. Cl.
*H04W 76/10* (2018.01)
*H04W 48/10* (2009.01)
(Continued)

(52) U.S. Cl.
CPC .......... *H04W 76/10* (2018.02); *H04W 48/10* (2013.01); *H04W 74/006* (2013.01);
(Continued)

(58) Field of Classification Search
CPC ... H04W 48/10; H04W 76/10; H04W 74/006; H04W 48/16; H04W 48/20; H04W 16/02
See application file for complete search history.

(56) References Cited

U.S. PATENT DOCUMENTS 6,484,224 B1 * 11/2002 Robins .................... G06F 15/16
                                                        710/305
8,724,604 B2    5/2014 Yang
(Continued)

FOREIGN PATENT DOCUMENTS

| CN | 101854740 A | 10/2010 |
| CN | 204206482 U | 3/2015 |
| WO | 2013/133911 A1 | 9/2013 |

OTHER PUBLICATIONS

Jul. 4, 2016 International Search Report issued in International Patent Application No. PCT/CN2016/079425.
(Continued)

*Primary Examiner* — Tejis Daya
(74) *Attorney, Agent, or Firm* — Oliff PLC

(57) ABSTRACT

The invention discloses a method for controlling a wireless access device, comprising: storing the channel information when the first processor receives a channel information transmitted by the second processor; wherein, a current used channel information is transmitted from the second processor to the first processor when the second processor is detected to establish a connection with the other wireless devices; establishing a wireless connection between the first processor through channels which are different from the stored channel information and the other wireless devices. The invention also provides a equipment for controlling the
(Continued)

Real-time detecting wireless signals by the second processor, and generating a wireless device list according to the detected wireless signals  — S50

Establishing a wireless connection between the second processor and a wireless device which is chosen from a wireless device list, and transmitting the currently used channel information from the second processor to the first processor, for storing the channel information when the first processor receives the channel information from the second processor — S60 wireless access device. According to the method and the equipment, channel avoidance is performed automatically during establishment of a wireless connection of the wireless access device, so that the technical problem of co-channel interference is solved.

8 Claims, 4 Drawing Sheets

(51) Int. Cl.
*H04W 74/00* (2009.01)
*H04W 88/10* (2009.01)
*H04W 16/02* (2009.01)
*H04W 48/16* (2009.01)
*H04W 48/20* (2009.01)

(52) U.S. Cl.
CPC ............ *H04W 88/10* (2013.01); *H04W 16/02* (2013.01); *H04W 48/16* (2013.01); *H04W 48/20* (2013.01)

(56) References Cited

U.S. PATENT DOCUMENTS

| | | | |
|---|---|---|---|
| 8,804,732 B1* | 8/2014 | Hepting | H04W 76/11 370/392 |
| 10,051,688 B1* | 8/2018 | Huang | H04L 61/6009 |
| 2005/0124331 A1* | 6/2005 | Munje | G06F 1/30 455/418 |
| 2010/0172285 A1* | 7/2010 | Tokuyasu | H04W 88/04 370/315 |
| 2011/0292922 A1* | 12/2011 | Yang | H04L 45/60 370/338 |
| 2012/0207057 A1* | 8/2012 | Karaoguz | G01S 5/0252 370/254 |
| 2014/0044014 A1* | 2/2014 | Kanigicherla | H04L 45/586 370/254 |

OTHER PUBLICATIONS

Jul. 4, 2016 Written Opinion issued in International Patent Application No. PCT/CN2016/079425.

* cited by examiner

METHOD FOR CONTROLLING A WIRELESS ACCESS DEVICE USING CHANNEL AVOIDANCE BETWEEN PROCESSORS OF THE WIRELESS ACCESS DEVICE

TECHNICAL FIELD

The invention relates to the field of wireless networking technology, especially relates to a method and an equipment for controlling a wireless access device.

BACKGROUND OF THE INVENTION

With the advent of the information era, intelligence and networking are gradually becoming a reality. To build LAN (Local Area Network) within a certain limits space (such as home, company and so on)is becoming increasingly popular with people, for example, take home as an example, for a central equipment of home network, the home gateway not only serves as a external network for accessing home interior and a physical interface which make the home interior network be connected with the external network, but also a platform for a user to obtain various home services.

The current home gateway only has one core processor which could switch back and forth between AP (Access point) mode and STA (Station) mode according to time-sharing mode, if the network is built through relay mode, and the AP mode and the STA mode can only work under the same channel which may cause co-channel interference.

SUMMARY OF THE INVENTION

The invention provides a method and an equipment for controlling a wireless access device, which mainly aims to automatically perform channel avoidance when a wireless connection is established, thereby solving the technical problem of co-channel interference.

To achieve the above-mentioned object, the present invention provides a method for controlling a wireless access device, comprising:

a first processor for providing wireless access services which are allocated for other wireless device access; and a second processor connected to the first processor, for accessing the other access points which provide wireless access services;

wherein a communication protocol between the first processor and the second processor is transmitted with a wired interface and a communication interface;

the method for controlling a wireless access device comprises:

storing the channel information when the first processor receives a channel information transmitted by the second processor; wherein, a current used channel information is transmitted from the second processor to the first processor when the second processor is detected to establish a connection with the other wireless devices;

establishing a wireless connection between the first processor through channels which are different from the stored channel information and the other wireless devices.

Preferably, the steps of establishing a wireless connection between the first processor through channels which are different from the stored channel information and the other wireless devices comprising :

generating an available channel list from the first processor based on its stored channel information;

establishing a connection between the first processor through channels which are chosen from the available channel list and the other wireless devices, and the channels have the least devices and the best signal strength.

Preferably, the first processor and the second processor are further provided with a wired network interface used for connecting with external devices, after the steps of establishing a wireless connection between the first processor through channels which are different from the stored channel information and the other wireless devices, the method further comprising:

determining the current connection of the second processor by the first processor according to broadcast packets, when the first processor receives the broadcast packets from the second processor;

transmitting a normal connection information from the first processor to the second processor, for the second processor to disenable its wireless interface according to the normal connection information, when a wired connection is established between the second processor and the other devices via the wired network interface which is determined by the first processor according to the broadcast packets.

Preferably, after the steps of transmitting a normal connection information from the first processor to the second processor, when a wired connection is established between the second processor and the other devices via the wired interface which is determined by the first processor according to the broadcast packets, the control method also comprising:

real-time detecting whether the first processor could receive the broadcast packets from the second processor;

transmitting a disconnection information from the first processor to the second processor, for the second processor to enable its wireless network interface according to the disconnection information, when it is detected that the first processor could not receive the broadcast packets from the second processor.

Furthermore, to achieve the above-mentioned object, the invention also provides a control method for a wireless access device, comprising:

a first processor for providing wireless access services which are allocated for other wireless device access; and a second processor connected to the first processor, for accessing the other access points which provide wireless access services;

wherein a communication protocol between the first processor and the second processor is transmitted with a wired interface and a communication interface;

the method for controlling a wireless access device comprises:

real-time detecting wireless signals by the second processor, and generating a wireless device list according to the detected wireless signals;

establishing a wireless connection between the second processor and a wireless device which is chosen from a wireless device list, and transmitting the currently used channel information from the second processor to the first processor, for the first processor to store the channel information when it receives the channel information from the second processor.

Preferably, the steps of establishing a wireless connection between the second processor and a wireless device which is chosen from a wireless device list comprising:

detecting whether the first processor is contained in the wireless device list by the second processor according to the pre-stored physical address of the first processor;

deleting the first processor from the wireless device list and establishing a wireless connection between the first processor and the wireless device which is chosen from the wireless device list without the first processor, if the first processor is contained in the wireless device list.

Preferably, after the steps of establishing a wireless connection between the second processor and a wireless device which is chosen from a wireless device list, the control method also comprising:

real-time transmitting broadcast pockets to the wireless device by the second processor;

disconnecting the second processor from the wireless device and searching other wireless devices to establish connection if the second processor receives the above-mentioned broadcast pockets.

Preferably, the first processor and the second processor are further provided with a wired network interface used for connecting with external devices, after the steps of establishing a wireless connection between the second processor and a wireless device which is chosen from a wireless device list, the control method also comprising:

transmitting broadcast pockets to the first processor by the second processor, for the first processor to determine the current connection of the second processor according to broadcast packets, when a wired connection is established between the second processor and other devices through a wired network interface;

disenabling its wireless network interface by the second processor according to the normal connection information when the second processor receives the normal connection information from the first processor.

In addition, to achieve the above-mentioned object, the invention also provides a equipment for controlling a wireless access device, the wireless access device comprising:

a first processor for providing wireless access services which are allocated for other wireless device access; and a second processor connected to the first processor, for accessing the other access points which provide wireless access services;

wherein a communication protocol between the first processor and the second processor is transmitted with a wired interface and a communication interface;

the equipment for controlling a wireless access device comprises:

an information storage module, for storing the channel information when it receives the channel information from the second processor; wherein, the currently used channel information is transmitted from the second processor to the first processor when it is detected that a connection is established between the second processor and other wireless devices;

a network link module, for establishing a wireless connection between the first processor through channels which are different from the stored channel information and the other wireless devices.

In addition, to achieve the above-mentioned object, the invention also provides a equipment for controlling a wireless access device, the wireless access device comprising:

a first processor for providing wireless access services which are allocated for other wireless device access; and a second processor connected to the first processor, for accessing the other access points which provide wireless access services;

wherein a communication protocol between the first processor and the second processor is transmitted with a wired interface and a communication interface;

the equipment for for controlling a wireless access device comprises:

a signal detecting module, for real-time detecting wireless signals, and generating a wireless device list according to the detected wireless signals;

an information transmitting module, for establishing a wireless connection between the second processor and a wireless device which is chosen from a wireless device list, and transmitting the currently used channel information from the second processor to the first processor, for the first processor to store the channel information when it receives the channel information from the second processor.

The present invention proposes a method and a equipment for controlling a wireless access device, to provide a channel automatically shifting mechanism. Wherein, the first processor stores a channel which is occupied by the second processor connected with other wireless devices, automatically performs channel avoidance and chooses to use channels different from the stored channel when a wireless connection between the first processor and other wireless devices is established, so that the technical problems of co-channel interference is solved.

Figure 1:
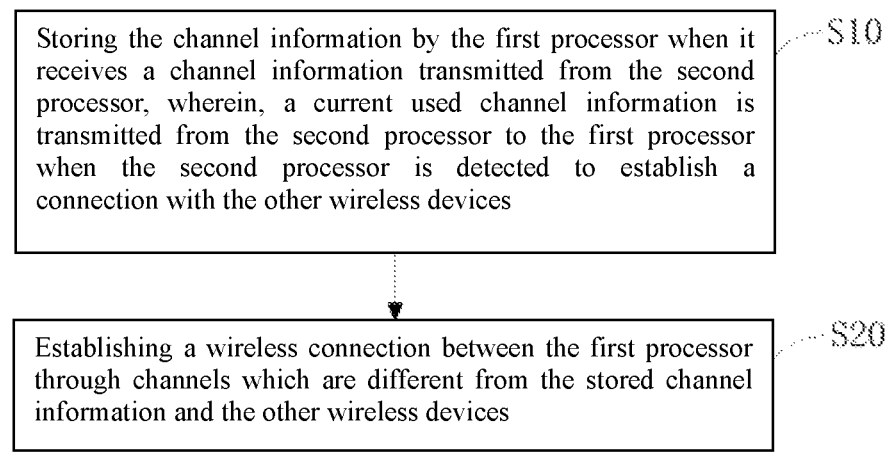
FIG. 1 is a flow chart of the method for controlling a wireless access device presented in the first embodiment of the present invention.

The achievement of the aim, function features and advantage of the present invention will be further illustrated by combining the embodiment and referring to the drawings.

DETAILED DESCRIPTION OF THE INVENTION

It should be understood, the specific embodiment described herein is merely intended for explaining the present invention, but not to limit the present invention.

The present invention provides a method for controlling a wireless access device.

A flow chart of the method for controlling a wireless access device presented in the first embodiment of the present invention is with reference to FIG. 1.

In the first embodiment, by using the first processor as an executive subject, the method for controlling a wireless access device comprising:

In step S10, storing the channel information when the first processor receives a channel information transmitted by the second processor; wherein, a current used channel information is transmitted from the second processor to the first processor when the second processor is detected to establish a connection with the other wireless devices.

It should be noted that, the method for controlling a wireless access device is based on a wireless access device, comprising: a first processor for providing wireless access services which are allocated for other wireless device access; and a second processor connected to the first processor, for accessing the other access points which provide wireless access services; wherein, a communication protocol between the first processor and the second processor is transmitted with a wired interface and a communication interface. A network is structured by the wireless access device through the first processor and the second processor, to form a wireless local area network (WLAN), and thus providing a WLAN service, for example, a WIFI net, and so on. In this embodiment, a wired connection between the first processor and the second processor is established, and the first processor is provided in the AP (Access Point) mode which is used to provide wireless access services for access to the other wireless devices, the second processor is provided in the STA (Station) mode for access to the other access point which can provide wireless access services.

The present invention provides a channel automatically shifting mechanism. The second processor of the wireless access device will take a channel when establishing a wireless connection between the the second processor and the other wireless devices through a wireless network interface. At this moment, the currently used channel information including channel frequency information or channel number information is transmitted from the second processor to the first processor, so as to avoid the first processor of the wireless access device using the same channel to establish a wireless connection, which would impact data transmission speed.

The first processor stores the channel information when it receives a channel information transmitted by the second processor.

In step S20, establishing a wireless connection between the first processor through channels which are different from the stored channel information and the other wireless devices.

A channel in which channel information is different from the stored channel information is chosen to use when establishing a wireless connection between the first processor and other wireless devices.

Furthermore, after the step S20, the method for controlling a wireless access device also comprising:

Generating an available channel list from the first processor based on its stored channel information;

Establishing a connection between the first processor through channels which are chosen from the available channel list and the other wireless devices, and the channels have the least devices and the best signal strength.

A channel with the least devices and best signal strength make the first processor get a faster transmission rate.

It should be noted that, the first processor and the second processor of this embodiment could be provided with one or more wired network interfaces for connecting with the external devices according to the user's needs. Further more, the method of the present invention have no limits on the frequency band of the wireless network, and it could be used for different frequency bands, such as wireless frequency bands including 2.4 GHz and 5.8 GHz.

The embodiment proposes a control method for a wireless access device, to provide a channel automatically shifting mechanism. Wherein, the first processor stores a channel which is occupied by the second processor connected with other wireless devices, automatically performs channel avoidance and chooses to use channels different from the stored channel when a wireless connection between the first processor and other wireless devices is established, so that the technical problems of co-channel interference is solved.

Figure 2:
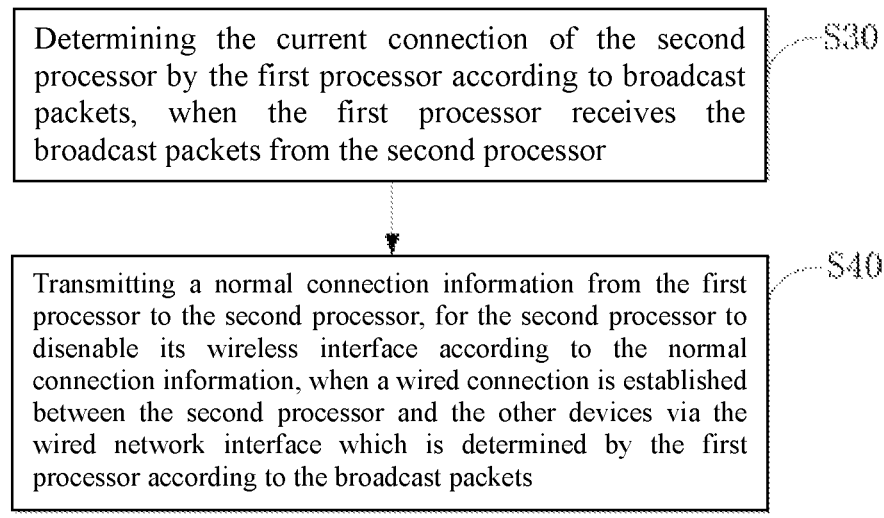
FIG. 2 is a flow chart of the method for controlling a wireless access device presented in the second embodiment of the present invention.

A flow chart of the method for controlling a wireless access device presented in the second embodiment of the present invention is with reference to FIG. 2. In this embodiment, the difference between the method herein and the method in the first embodiment is that, after the step S20, the method for controlling a wireless access device also comprising:

In step S30, determining the current connection of the second processor by the first processor according to broadcast packets, when the first processor receives the broadcast packets from the second processor.

It should be noted that, the second processor contained in the wireless access device of this embodiment is provided with a wired network interface for connecting with the external devices.

In step S40, transmitting a normal connection information from the first processor to the second processor, for the second processor to disenable its wireless interface according to the normal connection information, when a wired connection is established between the second processor and the other devices via the wired network interface which is determined by the first processor according to the broadcast packets.

The broadcast pockets will be transmitted from the second processor to the first processor if the status of its network connection is normal. The first processor could determine whether the connection between the second processor and the external device is a wireless connection or a wired connection according to the communication protocol between the first processor and the second processor, and the content of the received broadcast pockets. If the current connection between the second processor and the external device is a wired connection and the first processor could receive the broadcast pockets, it is indicate that the wired connection is available and the normal connection information will be transmitted from the first processor to the second processor. The second processor is operable to disenable the wireless network interface in order to break the wireless network connection when it receives the normal connection information.

It should be noted that, the broadcast pockets and information between the first processor and the second processor is transmitted via the wired network interface and the communication interface inside the wireless access device.

Furthermore, after the step S40, the method for controlling the wireless access device also comprising:

Real-time detecting whether the first processor could receive the broadcast pockets from the second processor;

Transmitting a disconnection information from the first processor to the second processor, for the second processor to enable its wireless network interface according to the above-mentioned disconnection information, when it is detected that the first processor could not receive the broadcast pockets from the second processor.

It is detected in real-time whether the first processor could receive the broadcast pockets from the second processor, and the second processor is operable to transmit the received broadcast pockets to the first processor if the current wired connection of the second processor is normal. If the first processor could not receive the broadcast pockets, it is determined that the current wired connection malfunctions and can not transfer data, and the first processor is operable to transmit a disconnection information to the second processor, for the second processor to enable its wireless network interface according the disconnection information.

The wireless network interface of the second processor is enabled, and the second processor is swifted to wireless connection mode, and other wireless devices are searched for access of the second processor when the second processor receives the disconnection information.

The embodiment proposes a method for controlling a wireless access device, comprising: determining whether the first processor could receive the wired broadcast pockets from the second processor, in order to estimate whether the current wired connection of the second processor is available. If the current wired connection is available, The second processor is operable to disenable the wireless network interface. If it is detected that the first processor cannot receive the broadcast pockets from the second processor, the second processor will be operable to enable the wireless network interface, and search the other wireless devices for access of the second processor. Relative to the prior art which need to manually switch the connection mode of the wireless device, the present invention do not have to manually operate the connection mode of the wireless access device, and could intelligently switch between the wired network and the wireless network based on the current network connection status.

Figure 3:
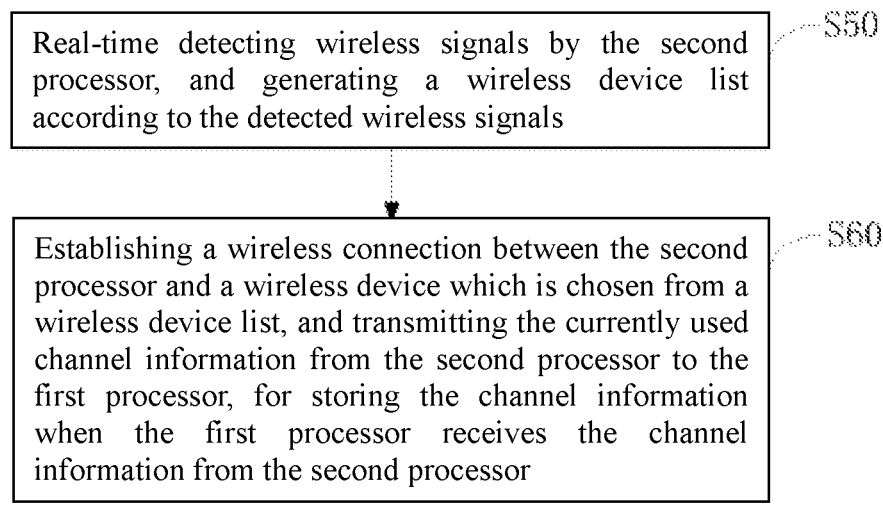
FIG. 3 is a flow chart of the method for controlling a wireless access device presented in the third embodiment of the present invention.

A flow chart of the method for controlling a wireless access device presented in the third embodiment of the present invention is with reference to FIG. 3. In this embodiment, the second processor is considered as an executive subject, the method for controlling a wireless access device comprising:

In step S50, real-time detecting the wireless signal by the second processor, and generating a wireless device list according to the detected wireless signal.

It should be noted that, the method for controlling a wireless access device is based on a wireless access device, comprising: a first processor for providing wireless access services which are allocated for other wireless device access; and a second processor connected to the first processor, for accessing the other access points which provide wireless access services; wherein, a communication protocol between the first processor and the second processor is transmitted with a wired interface and a communication interface. A network is structured by the wireless access device through the first processor and the second processor, to form a wireless local area network (WLAN), and thus providing a WLAN service, for example, a WIFI net, and so on. In this embodiment, a wired connection between the first processor and the second processor is established, and the first processor is provided in the AP (Access Point) mode which is used to provide wireless access services for access to the other wireless devices, the second processor is provided in the STA (Station) mode for access to the other access point which can provide wireless access services.

The second processor detects the wireless signal all around in real-time, and generates a wireless device list according to the detected wireless signal, for example, by setting a certain threshold value. Thus, it is determined that the device corresponding to the above-mentioned wireless signal is an available device and then added to the wireless device list if the wireless signal strength of the wireless device is stronger than the threshold value, and the threshold value could be adjusted according to the demand. And then, the wireless device with the strongest wireless signal is chosen to establish wireless connection with the second processor.

In step S60, establishing a wireless connection between the second processor and the wireless devices chosen from the wireless device list, and transmitting the currently used channel information to the first processor from the second processor, for the first processor to store the channel information when it receives the channel information from the second processor.

The second processor of the wireless access device will take a channel when establishing a wireless connection between the the second processor and the other wireless devices through a wireless network interface. At this moment, the currently used channel information including channel frequency information or channel number information is transmitted from the second processor to the first processor, so as to avoid the first processor of the wireless access device using the same channel to establish a wireless connection, which would impact data transmission speed.

The present embodiment proposes a method for controlling a wireless access device, to provide a channel automatically shifting mechanism, thereby avoiding the first processor using the same channel with the second processor when a wireless connection between the first processor and other wireless devices is established, which would influence the speed of the data transmission.

Figure 4:
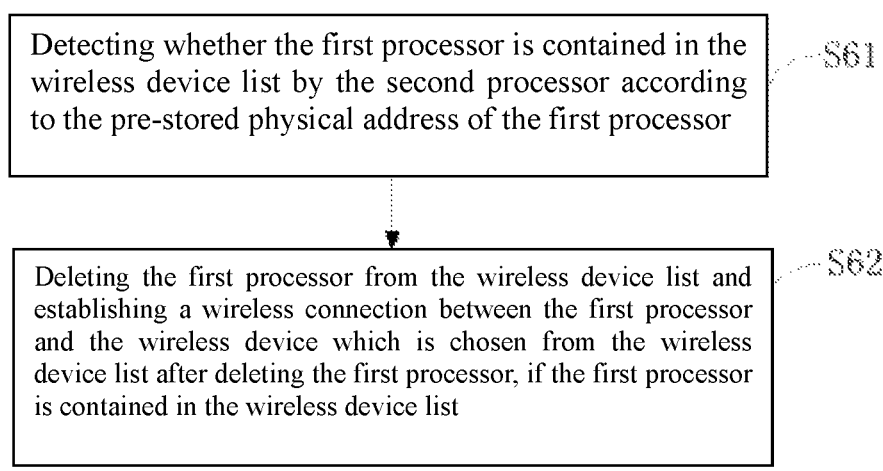
FIG. 4 is a flow chart of the method for controlling a wireless access device presented in the fourth embodiment of the present invention.

A flow chart of the method for controlling a wireless access device presented in the fourth embodiment of the present invention is with reference to FIG. 4. In the present embodiment, the differences between the method herein and the method in the third embodiment is that, the step S60 comprising the followed detailing steps:

In step S61, detecting whether the first processor is contained in the wireless device list by the second processor according to the physical address of the first processor which has been pre-stored in the second processor;

In step S62, deleting the first processor from the wireless device list by the second processor, and choosing a wireless device from the wireless device list without the first processor to establish wireless connection, if the wireless device list contains the first processor.

After enabling the wireless access device, the first processor will be operable to transmit its physical address to the second processor, for the second processor to store the physical address. Thus, the second processor could estimate whether the physical address of each detected wireless device is the same with the stored physical address. If the above-mentioned physical address is the same with the stored one, it is indicated that the device is the first processor, the second processor will delete the first processor from the devices list, and connect with one of the other devices in the device list, avoiding the second processor to establish wireless connection with the first processor, causing local interconnection, and thereby causing the wireless access device to malfuction.

Further more, after the step S60, the method also comprising the followed steps:

Transmitting broadcast pockets from the second processor to the first processor, when establishing a wired connection with other devices via wired network interface, for the first processor to estimate the current connection mode of the second processor according to the broadcast pockets;

Disenabling the wireless network interface by the second processor according to the normal connection information when the second processor receives the normal connection information from the first processor.

The broadcast pockets will be transmitted from the second processor to the first processor if the status of its network connection is normal. The first processor could determine whether the connection between the second processor and the external device is a wireless connection or a wired connection according to the communication protocol between the first processor and the second processor, and the content of the received broadcast pockets. If the current connection between the second processor and the external device is a wired connection and the first processor could receive the broadcast pockets, it is indicate that the wired connection is available and the normal connection information will be transmitted from the first processor to the second processor. The second processor is operable to disenable the wireless network interface in order to break the wireless network connection when it receives the normal connection information.

The present embodiment proposes a method for controlling wireless access device, to determine whether the first processor could receive the cable broadcast pocket from the second processor, for estimating whether the current wired connection of the second processor is available. If the wired connection is available, the second processor is operable to disenable the wireless network interface, if it is detected that the first processor could not receive the broadcast pocket from the second processor, the second processor will be operable to enable its wireless network interface, and search the other wireless devices for access of the second processor. Relative to the prior art which need to manually switch the connection mode of the wireless device, the present invention do not have to manually operate the connection mode of the wireless access device, and could intelligently switch between the wired network and the wireless network based on the current network connection status.

Figure 5:
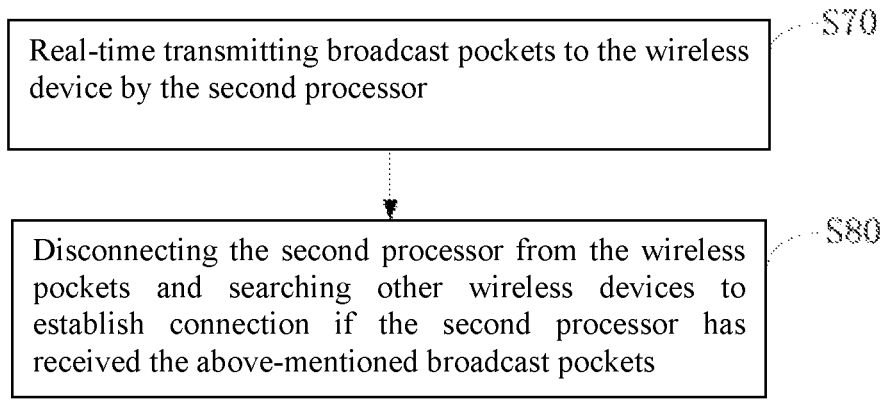
FIG. 5 is a flow chart of the method for controlling a wireless access device presented in the fifth embodiment of the present invention.

A flow chart of the method for controlling a wireless access device presented in the fifth embodiment of the present invention is with reference to FIG. 5. In this embodiment, the difference between the method herein and the method in the forth embodiment is that, after the step S60, the method also comprising the followed steps:

In step S70, real-time transmitting the wireless device broadcast pockets by the second processor;

In step S80, disconnecting the second processor from the wireless device, and searching other wireless devices to establish a connection, if it could receive the broadcast pockets.

The second processor is operable to transmit the broadcast pockets to the connected device in real-time, if the broadcast pockets from the second processor pass through one or more wireless access devices connected with the second processor and return to the second processor, i.e., the second processor receives broadcast pockets from itself, it could be determine that the connection loop has appeared in the current network connection. That is to say, multiple interconnected wireless devices in the current network have generate a ring circuit, causing the data cannot be transmitted correctly, and thus disconnecting the current wireless connection of the second processor and searching other wireless devices for accessing again.

The method for controlling the wireless access device proposed in this embodiment could avoid the ring circuit in network.

The present invention also present a control equipment for the wireless access device.

Figure 6:
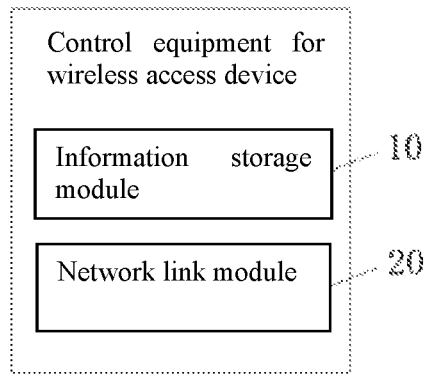
FIG. 6 is a function module diagram of the method for controlling a wireless access device presented in the first embodiment of the invention.

A function module diagram of the method for controlling a wireless access device presented in the first embodiment of the invention is with reference to FIG. 6.

In the embodiment, the control equipment for the wireless access device comprising:

An information storage module 10, for storing the channel information when it receives a channel information from the second processor; wherein, the second processor is operable to transmit the currently used channel information to the first processor when it is detected that a connection is established between the second processor and other wireless devices.

It should be noted that, an equipment for controlling a wireless access device present in the embodiment is based on a wireless access device, comprising: a first processor for providing wireless access services which are allocated for other wireless device access; and a second processor connected to the first processor, for accessing the other access points which provide wireless access services; wherein, a communication protocol between the first processor and the second processor is transmitted with a wired interface and a communication interface. A network is structured by the wireless access device through the first processor and the second processor, to form a wireless local area network (WLAN), and thus providing a WLAN service, for example, a WIFI net, and so on. In this embodiment, a wired connection between the first processor and the second processor is established, and the first processor is provided in the AP (Access Point) mode which is used to provide wireless access services for access to the other wireless devices, the second processor is provided in the STA (Station) mode for access to the other access point which can provide wireless access services.

The present embodiment provides a channel automatically shifting mechanism, and the second processor of wireless access device holds a certain channel when connecting with a wireless device via a wireless network interface, such that the second processor will be operable to transmit the currently used channel information such as the single frequency points information or the channel number to the first processor, in order to avoid using the same channel with the second processor which could influence the speed of data transmission when a wireless connection is established between the first processor and other wireless devices.

The information storage module 10 stores the channel information when the first processor receives a channel information from the second processor.

A network link module 20, for establishing a wireless connection between the first processor employed with a channel which is different from the stored channel information and the other wireless devices.

The network link module 20 is operable to choose a channel information which is different from the stored channel information when establishing a wireless connection with a wireless device and choosing a channel Furthermore, the equipment for controlling the wireless access device also comprising:

A list generating module, for generating an available channel list according to the stored channel information;

A connection establishing module, for establishing a connection between a channel with the least devices and the best signal strength and a wireless device, wherein, the channel is chosen from the available channel list.

The connection establishing module chooses the channel with the least connected device and the strongest signal strength, so as to make the first processor getting a faster speed for data transmitting.

It should be noted that, the first processor and the second processor of this embodiment could be provided with one or more wired network interfaces for connecting with the external devices according to the user's needs. Further more, the device of the present invention have no limits on the frequency band of the wireless network, and it could be used for different frequency bands, such as wireless frequency bands including 2.4 GHz and 5.8 GHz. The device presented in this embodiment could be a first processor. The information storage module 10 and the network link module 20 are virtual modules with different function and provided in the first processor, respectively.

The present embodiment proposes a equipment for a wireless access device, to provide a channel automatically shifting mechanism. Wherein, the first processor stores a channel which is occupied by the second processor connected with other wireless devices, automatically performs channel avoidance and chooses to use channels different from the stored channel when a wireless connection between the first processor and other wireless devices is established, so that the technical problems of co-channel interference is solved.

Figure 7:
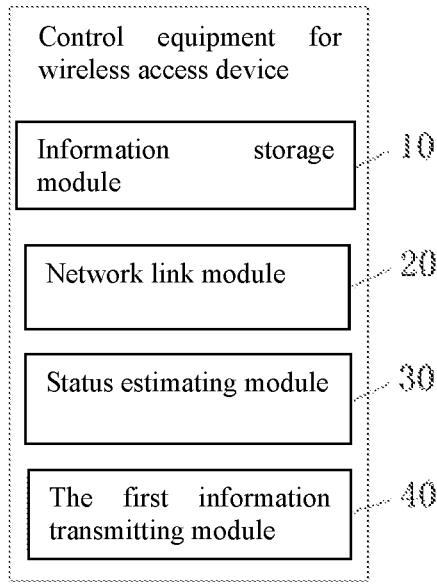
FIG. 7 is a function module diagram of the method for controlling a wireless access device presented in the second embodiment of the invention.

A function module diagram of the method for controlling a wireless access device presented in the second embodiment of the invention is with reference to FIG. 7. In this embodiment, the difference between the equipment herein and the equipment in the first embodiment is that, the equipment for controlling the wireless access device also comprising:

A status estimating module 30, for estimating the current connection mode of the second processor according to the broadcast pockets when receiving the broadcast pockets from the second processor.

It should be noted that, the second processor of the wireless access device presented in this embodiment is provided with a wired network interface for connecting with the external devices.

A first information transmitting module 40, for transmitting a normal connection information to the second processor such that the second processor could be operable to disenable its wireless network interface according to the normal connection information, when it is determined by the first processor that, a wired connection is established between the second processor and other devices via the wired network interface, according to the broadcast pockets.

The broadcast pockets will be transmitted from the second processor to the first processor if the status of its network connection is normal. The first processor could determine whether the connection between the second processor and the external device is a wireless connection or a wired connection according to the communication protocol between the first processor and the second processor, and the content of the received broadcast pockets. If the current connection between the second processor and the external device is a wired connection and the first processor could receive the broadcast pockets, it is indicate that the wired connection is available and the normal connection information will be transmitted from the first processor to the second processor. The second processor is operable to disenable the wireless network interface in order to break the wireless network connection when it receives the normal connection information.

It should be noted that, the broadcast pockets and information are transmitted between the first processor and the second processor via the wired network interface and the communication interface inside the wireless access device.

Furthermore, the control equipment for the wireless access device also comprising:

A data detecting module, for real-time detecting whether the broadcast pockets from the second processor could be received;

The first information transmitting module 40, also for transmitting a disconnection information to the second processor, when it is detected that the first processor cannot receive the broadcast pockets from the second processor, for the second processor to open its wireless network interface according to the disconnection information.

It is detected in real-time whether the first processor could receive the broadcast pockets transmitted from the second processor. The second processor will be operable to transmit the received broadcast pockets to the first processor if its wired connection is normal. The data detecting module will detect whether it could receive the broadcast pocket, if the first processor cannot receive the broadcast pocket, indicating the current wired connection malfunctions and data cannot be transmitted through the wired connection. Thus, the first information transmitting module 40 will be operable to transmit a disconnection information to the second processor, for the second processor to open its wireless network interface according to the disconnection information.

The wireless network interface of the second processor is enabled, and the second processor is swifted to wireless connection mode, and other wireless devices are searched for access of the second processor when the second processor receives the disconnection information.

The embodiment proposes a method for controlling a wireless access device, comprising: determining whether the first processor could receive the wired broadcast pockets from the second processor, in order to estimate whether the current wired connection of the second processor is available. If the current wired connection is available, The second processor is operable to disenable the wireless network interface. If it is detected that the first processor cannot receive the broadcast pockets from the second processor, the second processor will be operable to enable the wireless network interface, and search the other wireless devices for access of the second processor. The present invention do not have to manually operate the connection mode of the wireless access device, and could intelligently switch between the wired network and the wireless network based on the current network connection status.

Figure 8:
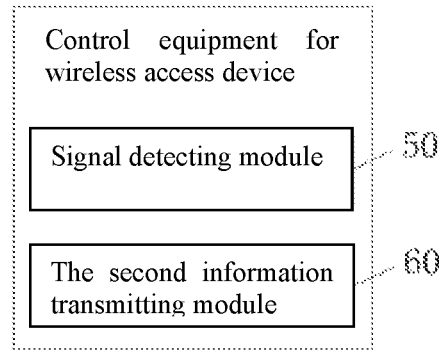
FIG. 8 is a function module diagram of the method for controlling a wireless access device presented in the third embodiment of the invention.

A function module diagram of the method for controlling a wireless access device presented in the third embodiment of the invention is with reference to FIG. 8.

In this embodiment, the control equipment for the wireless access device comprising:

A signal detecting module 50, for real-time detecting wireless signals, and generating a wireless device list according to the detected wireless signals.

It should be noted that, a equipment for controlling the wireless access device of the embodiment is based on a wireless access device, comprising: a first processor for providing wireless access services which are allocated for other wireless device access; and a second processor connected to the first processor, for accessing the other access points which provide wireless access services; wherein, a communication protocol between the first processor and the second processor is transmitted with a wired interface and a communication interface. A network is structured by the wireless access device through the first processor and the second processor, to form a wireless local area network (WLAN), and thus providing a WLAN service, for example, a WIFI net, and so on. In this embodiment, a wired connection between the first processor and the second processor is established, and the first processor is provided in the AP (Access Point) mode which is used to provide wireless access services for access to the other wireless devices, the second processor is provided in the STA (Station) mode for access to the other access point which can provide wireless access services.

The signal detecting module 50 detects the wireless signal around the second processor in real-time, and generates a wireless device list according to the detected wireless signal, for example, by setting a certain threshold value. Thus, it is determined that the device corresponding to the above-mentioned wireless signal is an available device and then added to the wireless device list if the wireless signal strength of the wireless device is stronger than the threshold value, and the threshold value could be adjusted according to the demand. Then, the wireless device with the strongest wireless signal is chosen to establish a wireless connection with the second processor.

A second information transmitting module 60, for establishing a wireless connection between the second processor and a wireless device which is chosen from the wireless device list, and transmitting the currently used channel information from the second processor to the first processor, for the second processor to store the channel information when the first processor receives the channel information transmitted from the second processor.

The second processor of a wireless access device holds a certain channel when connecting with a wireless device via a wireless network interface, such that the second information transmitting module 60 will be operable to transmit the currently used channel information such as the single frequency points information or the channel number to the first processor, in order to avoid using the same channel with the second processor which could influence the speed of data transmission when a wireless connection is established between the first processor and other wireless devices.

The present embodiment could be the second processor, the signal detecting module 50 and the second information transmitting module 60 are virtual modules with different function respectively and provided in the first processor.

Figure 9:
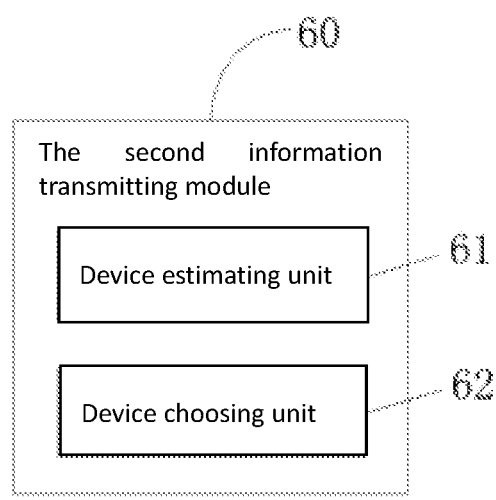
FIG. 9 is a function module diagram of the method for controlling a wireless access device presented in the fourth embodiment of the invention.

The present embodiment proposes a control equipment for a wireless access device, to provide a channel automatically shifting mechanism, thereby avoiding the first processor using the same channel with the second processor when a wireless connection between the first processor and other wireless devices is established, which would influence the speed of the data transmission A function module diagram of the method for controlling a wireless access device presented in the fourth embodiment of the invention is with reference to FIG. 9. In the present embodiment, the differences between the equipment herein and the equipment in the third embodiment is that, the second information transmitting module 60 comprising the followed detail steps:

A device estimating unit 61, for detecting whether the first processor is in the wireless device list according to the physical address of the first processor which has been pre-stored.

A device choosing unit 62, for deleting the first processor from the wireless device list if the first processor is in the wireless device list, and establishing a wireless connection between the first processor and a wireless device chosen from the wireless device list without the first processor.

After enabling the wireless access device, the first processor will be operable to transmit its physical address to the second processor, for the second processor to store the physical address. Thus, the second information transmitting module 60 could estimate whether the physical address of each detected wireless device is the same with the stored physical address, if its physical address is the same with the stored one, it is indicated that the device is the first processor, the second information transmitting module 60 will delete the first processor from the devices list, and connect with one of the other devices in the device list, avoiding the second processor to establish wireless connection with the first processor, causing local interconnection, and thereby causing the wireless access device to mulfuction.

Furthermore, the second information transmitting module 60, also for transmitting broadcast pockets to the first processor when establishing a wired connection with other devices, for the first processor to estimate the current connection mode of the second processor based on the broadcast pockets.

The broadcast pockets will be transmitted from the second processor to the first processor if the network connection status of the second processor is normal. The first processor could determine whether the connection between the second processor and the external devices is a wireless connection or a wired connection according to the communication protocol between the first processor and the second processor, and the content of the received broadcast pockets. If the current connection between the second processor and the external devices is a wired connection and the first processor could receive the broadcast pockets, it is indicate that the wired connection is available and the normal connection information is transmitted from the first processor to the second processor. The second processor is operable to disenable the wireless network interface in order to break the wireless network connection when it receives the normal connection information.

The embodiment proposes a equipment for controlling a wireless access device, comprising: determining whether the first processor could receive the wired broadcast pockets from the second processor, in order to estimate whether the current wired connection of the second processor is available. If the current wired connection is available, The second processor is operable to disenable the wireless network interface. If it is detected that the first processor cannot receive the broadcast pockets from the second processor, the second processor will be operable to enable the wireless network interface, and search the other wireless devices for access of the second processor. Relative to the prior art which need to manually switch the connection mode of the wireless device, the present invention do not have to manually operate the connection mode of the wireless access device, and could intelligently switch between the wired network and the wireless network based on the current network connection status.

The fifth embodiment of the equipment for controlling a wireless access device in the present invention is presented based on the fourth embodiment of the equipment for controlling the wireless access device. In the present embodiment, the differences between the equipment herein and the equipment in the fourth embodiment is that:

the second information transmitting module 60, also for transmitting broadcast pocket to wireless equipment in real-time;

the device control module, also for disconnecting the second processor from the wireless device and searching the other wireless device to establish a connection, if it receives the broadcast pockets.

The second information transmitting module 60 is operable to transmit the broadcast pockets to the connected device in real-time, if the broadcast pockets from the second processor 30 passes through one or more wireless access devices connected with the second processor and returns to the second processor, i.e., the second processor receives a broadcast pocket from itself, it could be determined that the connection loop has appeared in the current network connection. That is to say, multiple interconnected wireless devices in the current network have generated a ring circuit, causing the data cannot be transmitted correctly, and thus disconnecting the current wireless connection of the second processor and searching other wireless devices for accessing again by the device control module.

The equipment for controlling the wireless access device presented in this embodiment could avoid the ring circuit in network.

The embodiment of the present invention described above are intended to be merely exemplary and those skilled in the art shall be able to make numerous variations and modifications without departing from the spirit of the present invention. All such variations and modifications are intended to be within the scope of the present invention as defined in the appended claims.

The invention claimed is:

1. A method for controlling a wireless access device including a first processor for providing wireless access services that are allocated for other wireless device access, and second processor connected to the first processor for accessing other access points that provide wireless access services, the method comprising:

transmitting a communication protocol between the first processor and the second processor through a wired interface to wiredly connect the first processor with the second processor;

storing, by the first processor, channel information transmitted by the second processor, wherein the channel information comprises currently used channel information second processer that is transmitted from the second processor to the first processor when the second processor is detected to establish a connection with the other wireless devices; and establishing a wireless connection between the first processor and the other wireless devices through channels with another channel information different from the channel information stored by the first processor.

2. The method for controlling a wireless access device of claim 1, wherein, the step of establishing a wireless connection between the first processor and the other wireless devices through channels with another channel information different from the channel information stored by the first processor comprises:

generating an available channel list by the first processor based on the channel information stored by the first processor, the available channel list not including the currently used channel information of the second processor;

establishing a connection between the first processor and the other wireless devices through channels which are chosen from the available channel list, wherein the connection is established using channels in the channel list that have a minimum number of devices and a best signal strength.

3. The method for controlling a wireless access device of claim 1, wherein the first processor and the second processor are further provided with a wired network interface used for connecting with external devices, and after the step of establishing a wireless connection between the first processor and the other wireless devices, the method further comprises:

determining a current connection of the second processor by the first processor according to broadcast packets when the first processor receives the broadcast packets from the second processor;

transmitting a normal connection information from the first processor to the second processor for the second processor to disenable its wireless interface according to the normal connection information when the first processor determines from the broadcast packets that the current connection of the second processor is a wired connection between the second processor and the other devices via the wired network interface.

4. The method for controlling a wireless access device of claim 1, wherein after the step of transmitting a normal connection information from the first processor to the second processor, the method further comprising:

real-time detecting whether the first processor could receive the broadcast packets from the second processor;

transmitting a disconnection information from the first processor to the second processor for the second processor to enable its wireless network interface according to the disconnection information when the first processor detects that it could not receive the broadcast packets from the second processor.

5. A method for controlling a wireless access device including a first processor for providing wireless access services that are allocated for other wireless device access, and second processor connected to the first processor for accessing other access points that provide wireless access services, the method comprising:

tranmitting a communication protocol between the first processor and the second processor through a wired interface, to wiredly connect the first processor, with the second processor;

real-time detecting, by the second processor, wireless signals, and generating a wireless device list according to the wireless signals detected by the second processor;

establishing, by the second processor, a wireless connection between the second processor and a wireless device that is chosen from the wireless device list; and transmitting a current used channel information from the second processor to the first processor for the first processor to store, the currently used channel information comprising channel information about the wireless connection between the second processor and the wireless device that is chosen from the wireless device list.

6. The method for controlling a wireless access device of claim 5, wherein, the step of establishing a wireless connection between the second processor and a wireless device that is chosen from a wireless device list further comprising:

detecting, by the second processor, whether the first processor is included in the wireless device list according to a pre-stored physical address of the first processor;

deleting the first processor from the wireless device list and establishing a wireless connection between the second processor and the wireless device that is chosen from the wireless device list without the first processor when the second processor detects that the first processor is contained in the wireless device list.

7. The method for controlling a wireless access device of claim 5, wherein after the step of establishing a wireless connection between the second processor and a wireless device that is chosen from the wireless device list, the control method further comprises:

real-time transmitting, by the second processor, broadcast packets to the wireless device;

disconnecting the second processor from the wireless device and searching for other wireless devices with which to establish a connection if the second processor receives the real-time transmitted broadcast packets.

8. The method for controlling a wireless access device of claim 5, wherein the first processor and the second processor are further provided with a wired network interface used for connecting with external devices, and after the step of establishing a wireless connection between the second processor and a wireless device that is chosen from a wireless device list, the control method further comprises:

transmitting, by the second processor, broadcast packets to the first processor for the first processor to determine a current connection of the second processor according to the broadcast packets when the current connection is a wired connection established between the second processor and other devices through the wired network interface;

disenabling, by the second processor, its wireless network interface according to a normal connection information when the second processor receives the normal connection information from the first processor in response to the broadcast packets transmitted by the second processor to the first processor.

* * * * *